United States Patent [19]

Brand et al.

[11] Patent Number: 5,349,035

[45] Date of Patent: Sep. 20, 1994

[54] COPOLYMERIZATION PROCESS AND OPTICAL COPOLYMER PRODUCED THEREFROM

[75] Inventors: Johannes Brand, Schalkhaar; Wilfridus M. Brouwer, Nijmegen, both of Netherlands

[73] Assignee: Akzo Nobel N.V., Netherlands

[21] Appl. No.: 30,037

[22] PCT Filed: Sept. 5, 1991

[86] PCT No.: PCT/EP91/01691

§ 371 Date: Apr. 16, 1993

§ 102(e) Date: Apr. 16, 1993

[87] PCT Pub. No.: WO92/05209

PCT Pub. Date: Apr. 2, 1992

[22] Filed: Apr. 16, 1993

[30] Foreign Application Priority Data

Sep. 18, 1990 [EP] European Pat. Off. ........ 90202484.3

[51] Int. Cl.$^5$ ........................ C08F 2/38; C08F 220/20
[52] U.S. Cl. ...................................... 526/284; 526/206; 526/214; 526/286; 526/289; 526/292.3; 526/292.5; 526/293; 526/313
[58] Field of Search ................ 526/214, 206, 313, 284

[56] References Cited

U.S. PATENT DOCUMENTS 4,615,584 10/1986 Ohmori et al. .................. 350/96.34
4,650,843 3/1987 Yokoyama et al. ................. 526/245

FOREIGN PATENT DOCUMENTS 58-217511 6/1982 Japan .
61-134701 6/1986 Japan .
2034721 6/1980 United Kingdom .
2176794 1/1987 United Kingdom .

OTHER PUBLICATIONS

Chemical Abstract No. 108:113483b, vol. 108, No. 14, Apr. 1988, pp. 36–37.
Chemical Abstract No. 111:174707m, vol. 111, No. 20, Nov. 13, 1989 p. 3.
International Search Report dated Dec. 20, 1991.

*Primary Examiner*—Mark Nagumo
*Attorney, Agent, or Firm*—Ralph J. Mancini; Louis A. Morris

[57] ABSTRACT

A process for preparing a copolymer suitable for use in an optical element which comprises the step of radically-polymerizing a composition which comprises at least one first monomer represented by formula (I), at least one second monomer represented by any one of formulas (II, III, and IV), and 0.005 to 1.0 weight percent of said polymerizable composition of an organic chain transfer agent having a chain transfer coefficient at 50°–60° C. of greater than 0.6 with acrylic monomer or styrenic monomer; in the presence of a radical polymerization initiator, is disclosed. Also disclosed is a copolymer suitable for use as an optical element obtained by the foregoing process and an optical element comprising this copolymer. The process of the disclosure provides essentially striation-free polymers which can be used to fabricate optical elements including thick lenses for glasses.

10 Claims, No Drawings

COPOLYMERIZATION PROCESS AND OPTICAL COPOLYMER PRODUCED THEREFROM

The present invention relates to a copolymerization process for the production of organic copolymers suitable for use in optical elements, the copolymers produced by the process and striation-free optical elements including these copolymers.

In the recent past, organic glass lenses have begun to replace inorganic glass lenses. Organic glass possesses several favorable characteristics including lighter weight, better safety, easier processability and good dyeability which offer advantages over inorganic glasses.

Attempts have been made to perfect the properties of organic glasses for use in lenses for spectacles. It has been found, for example, that a refractive index of at least 1.55 is needed in order to provide a lens of suitable thickness. Polymers such as polycarbonates and polystyrene having such a high refractive index cannot be processed by casting. Accordingly, in British Patent specification 2 034 721 the solution was proposed to copolymerize specific bifunctional acrylates or dimethacrylates with a radically polymerizable monomer such as styrene, to thereby produce an organic polymer having a refractive index in excess of 1.55.

While the foregoing polymer system provided a solution to the refractive index problem, it produced lenses which were highly inhomogeneous when relatively deep molds were employed. These inhomogeneous lenses included flow lines (optical strain) which interfere with the optical transmission of the lenses.

In response to this problem it was suggested to carry out the polymerization in the presence of $\alpha$-methylstyrene dimer in Japanese patent application JP-A-61 134701. While this solution reduced the optical strain in the copolymers it did not entirely solve the problem as was pointed out in the Japanese patent which states that the copolymer produced by this method exhibited slight optical strain.

This Japanese Patent Application also states, "If other chain transfer agents or polymerization degree regulators such as various mercaptans, dialkyl disulfides, thiuram disulfides, chloroform, carbon tetrachloride and carbon tetrabromide are used, their activity as a chain transfer agent or polymerization degree regulator is too strong, so that the polymerization degree of a resultant resin is depressed more than needed. As a result, various physical properties such as surface hardness, heat resistance, impact resistance, chemical resistance and processability deteriorate, or optical distortion increases and discoloration due to these chain transfer agents or polymerization degree regulators occurs. Thus, plastic lenses for eyeglasses are not obtained".

This statement clearly demonstrates that there is a strong prejudice among those of skill in the art against using strong chain transfer agents (i.e. chain transfer agents having a high chain transfer coefficient) to make particular copolymers for use in optical elements. Therefore, the present invention represents a surprising step forward in the art since it demonstrates that the prejudice is not justified and can be overcome by the use of particular amounts of such strong chain transfer agents.

In addition the presently claimed subject matter is novel with respect to this disclosure since specific amounts of the chain transfer agents are specified in the claims. The amount of the strong chain transfer agent referred to in this passage of the Japanese patent application is not disclosed. Further, the presently claimed amounts could not have been used since the presently claimed process does not produce unacceptable adverse effects on the properties of the copolymer, whereas the prior art use of a strong chain transfer agent produced significant adverse effects on the properties of the copolymer. Thus, the present process must be novel since it produces a different result than the prior art process.

Japanese patent application JP-A-58 217511 also suggests polymerization in the presence of $\alpha$-methylstyrene dimer in order to produce optically uniform lenses from allyl-group containing monomers. Further, Japanese patent application JP-A-57 104901 discloses the polymerization of a di(meth)acrylate monomer and an allylic monomer in the presence of a diunsaturated monomer to produce an impact resistant plastic lens.

However, none of the foregoing methods can provide a suitable copolymer composition for lenses which exhibits essentially no optical strain even in thick lens castings.

Accordingly, it is the primary object of the present invention to provide a process for making a copolymer for lenses which is homogeneous and exhibits essentially no optical strain.

It is another object of the present invention to provide a copolymer for lenses which can be used to cast thick lenses having essentially no optical strain.

These and other objects of the present invention will be apparent from the summary and detailed descriptions which follow.

The present invention relates to a process for preparing a copolymer suitable for use as an optical element which comprises the step of radically polymerizing a polymerizable composition which comprises at least 45% by weight, of the polymerizable composition, of at least one first monomer of represented by the formula (I):

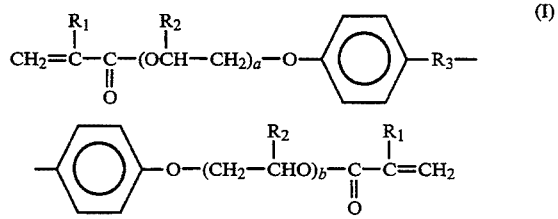

wherein a and b are integers of from 0 to 4,
$R_1$ and $R_2$ represent H or $CH_3$, and $R_3$ represents $-O-, -S-, -CO-, -SO_2-, -CH_2-,$ $-CH=CH-$ or $CH_3-\overset{|}{\underset{|}{C}}-CH_3;$ and
5–40 percent by weight, of the weight of the polymerizable composition, of at least one second monomer represented by any one of the formulas (II), (III) and (IV):

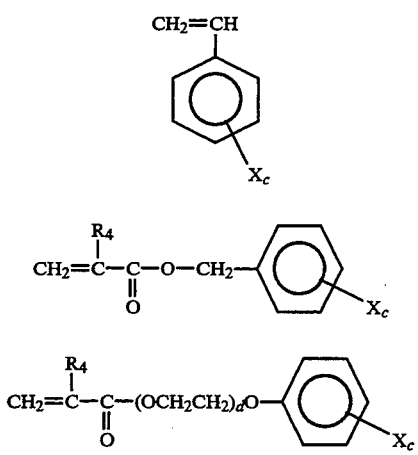

wherein $R_4$ represents H or $CH_3$, X represents H, $C_1$–$C_4$ alkyl or halogen other than fluorine, c represents an integer of from 0 to 5, and d represents an integer of from 0 to 5; in the presence of 0.005 to 1.0 weight percent, based on said polymerizable composition, of an organic chain transfer agent having a chain transfer coefficient at 50°–60° C. of greater than 0.5 with acrylic monomer or styrenic monomer to provide a substantially striation-free copolymer; in the presence of a radical polymerization initiator. The invention also relates to a copolymer suitable for use in an optical element obtained by the radical polymerization process of the present invention and to an optical element which comprises this copolymer.

The polymerizable composition of the present invention includes the first monomer of the formula I, a second monomer of the formulas II–IV and, optionally a third monomer as discussed below. The first monomer component having the general formula (I) is advantageously used in an amount of about 45 to 95% by weight and more preferably from 65 to 90% by weight of the polymerizable composition. The most preferred first monomer component is a compound of the formula (I) wherein $R_1$ is methyl, $R_2$ is hydrogen and $R_3$ is the group:

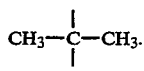

The second, styrenic monomer component having the general formula (II) is advantageously used in an amount of 5 to 40% by weight, of the polymerizable composition, more preferably, 10–30% by weight is employed. Among the second monomer components useful in the present invention, styrene is the most preferred.

The composition of the present invention may also optionally comprise a third component which may be present during the copolymerization process. These optional third components include, for example, naphthylmethacrylates such as α-naphthylmethacrylate, β-naphthylmethacrylate; phenoxyethylacrylate; phenoxyethylmethacrylate; vinylnaphthalenes such as 1-vinylnaphthalene and other monomers such as 4-vinylbiphenyl, divinylbenzene or vinylphenylsulfide. This third monomer component is radically polymerizable and may be used in the copolymerization in an amount of 0 to 50 percent by weight, of the polymerizable composition. In addition, to prevent lowering of the impact resistance of the polymer it may be useful to add alkyl(meth)acrylic acid ester such as butylmethacrylate to the copolymerization.

As an initiator for the present polymerization process is employed 0.05 to 2.0 wt %, based on said polymerizable composition, of a conventional peroxidic initiator. Suitable initiators include those that decompose at relatively low temperatures such as the peroxydicarbonates.

The chain transfer agent used in the present invention is an organic compound having a chain transfer coefficient of at least 0.5 at 50°–60° C. with acrylic monomer or styrenic monomer. The chain transfer agent is employed in an amount which is effective to provide a substantially striation-free copolymer composition. This amount will depend upon the chain transfer coefficient(s) of the chain transfer agent. In most circumstances, an amount of 0.005 to 1.0 wt %, based on the polymerizable composition is useful, and more preferably an amount of 0.05 to 0.5 wt %, based on the polymerizable composition is used.

Particular chain transfer agents which have been found suitable for use in the present invention include α-bromomethylstyrene, ethyl-2-bromomethylpropenoate, tetrabromomethane and trichlorobromomethane.

It has been found that by employing the particular chain transfer agents in the process of the present invention, one obtains a substantially striation-free copolymer having substantially less transfer agent or prepared with other chain transfer agents. This provides the ability to make optical elements from polymers with better optical transmission properties than was previously possible and also allows the casting of thicker lenses since the optical strain in such lenses can be essentially eliminated by the present process.

It has also been found that the use of chain transfer agents in the process of the present invention does not adversely effect other properties of the resultant copolymer. Thus, for example, the surface hardness, impact resistance and coloration of the copolymers produced by the present process, are all suitable for the fabrication of optical elements, including thick lenses for glasses.

To carry out the process of the present invention, one or more of the first monomer, one or more of the second monomer, the chain transfer agent and an initiator are mixed, if desired, together with a third monomer, to prepare a liquid casting mixture. The liquid is then poured into a casting mold and is cured by means of heating over a prescribed heating program. The particular heating program will depend upon the specific composition of the liquid mixture. The most advantageous manner for copolymerizing the liquid mixture is directly in a casting mold for a lens. In this way, one carries out the copolymerization and the lens fabrication in the same step.

The organic glass copolymer of the present invention has high strength, high refractive index, good solvent resistance, good surface hardness and is striation-free, thereby having essentially no optical strain. Thus, this material is suitable for all sorts of lenses including extremely thick lenses.

The primary use for the lens of the present invention is in opthalmic glasses but it is possible to use this lens for other purposes such as in cameras or other optical elements, or non-corrective optical elements such as sunglasses.

The following examples will further illustrate the present invention.

EXAMPLES 1-10

80 parts by weight of tetra-ethoxylated bisphenol A dimethacrylate was mixed with 20 parts by weight of styrene, 0.5 wt % of bis(4-t-butylcyclohexyl) peroxydicarbonate and various amounts of chain transfer agents as detailed in table 1. These mixtures were placed in glass molds having an 18 mm thick molding cavity and were polymerized in a water bath using the following temperature program: 6 hours at 35° C., a linear temperature rise program over 14 hours from 35° C. to 90° C. and 2 hours at 90° C. After this cycle, the water bath was cooled to 60° C. and the lenses were removed from the mold.

The lenses were checked for the presence of striations (optical strain) by visual inspection with the unaided eye and by employing polarized light. The presence of striations was graded as follows:

— = reference standard without chain transfer agent, significant striations visible with the unaided eye; + = improvement but some striations remain visible to the unaided eye; + + = no striations visible with unaided eye but some striations visible with polarized light; and + + + = no striations visible with either the unaided eye or polarized light. The results of the tests are listed in table I.

Comparative Example A

The procedure of example 1 was repeated except that no chain transfer agent was employed. The results are given in table 1.

Comparative Examples B,C,D,E,F and G

The procedure of example 1 was repeated except that α-methylstyrene dimer was employed as the chain transfer agent. The amount of α-methylstyrene employed and the test results are given in table I.

TABLE I

| Chain Transfer Agent | Example | Amount Used | Rating |
|---|---|---|---|
| ethyl-2-bromomethyl propenoate | 1 | 500 ppm | +++ |
| ethyl-2-bromomethyl propenoate | 2 | 1000 ppm | +++ |
| bromomethylstyrene | 3 | 500 ppm | ++ |
| bromomethylstyrene | 4 | 1000 ppm | ++ |
| trichlorobromomethane | 5 | 500 ppm | +++ |
| trichlorobromomethane | 6 | 1000 ppm | +++ |
| trichlorobromomethane | 7 | 2000 ppm | +++ |
| tetrabromomethane | 8 | 500 ppm | +++ |
| tetrabromomethane | 9 | 1000 ppm | +++ |
| tetrabromomethane | 10 | 5000 ppm | +++ |
| — | A | — | — |
| α-methylstyrene dimer | B | 500 ppm | + |
| α-methylstyrene dimer | C | 1000 ppm | + |
| α-methylstyrene dimer | D | 3000 ppm | + |
| carbon tetrachloride | E | 500 ppm | — |
| carbon tetrachloride | F | 1000 ppm | — |
| carbon tetrachloride | G | 5000 ppm | — |

The chain transfer coefficients (Cx) for the materials used in the examples were measured on styrene and methylmethacrylate (MMA) and are given in table II.

TABLE II

| Chain Transfer Agent | $C_x$-Styrene | Temp. | $C_x$-MMA | Temp. |
|---|---|---|---|---|
| ethyl-2-bromomethyl propenoate | 1.45 | 60° C. | 0.87 | 60° C. |

TABLE II-continued

| Chain Transfer Agent | $C_x$-Styrene | Temp. | $C_x$-MMA | Temp. |
|---|---|---|---|---|
| bromomethylstyrene | 2.93 | 60° C. | 2.27 | 60° C. |
| trichlorobromomethane | 65 | 60-80° C. | 1.2 | 30° C. |
| tetrabromomethane | 1.78 | 60° C. | 0.27 | 60° C. |
| α-methylstyrene dimer | 0.15 | 50° C. | 0.12 | 60° C. |
| carbon tetrachloride | 0.0069 | 60° C. | 0.0005 | 60° C. |

The foregoing examples serve merely to illustrate the present invention and are not to be construed as limiting the invention in any way. The scope of the invention is to be determined by the claims appended hereto.

We claim:

1. A process for preparing a copolymer suitable for use in an optical element which comprises the step of radically polymerizing a composition which comprises at least 45% by weight, of the weight of the polymerizable composition, of at least one first monomer of represented by the formula (I):

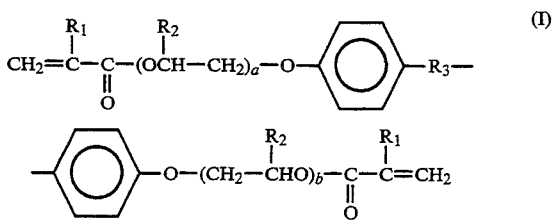

wherein a and b are integers of from 0 to 4,
$R_1$ and $R_2$ represent H or $CH_3$, and $R_3$ represents $-O-, -S-, -CO-, -SO_2-, -CH_2-,$ $-CH=CH-$ or $CH_3-\overset{|}{\underset{|}{C}}-CH_3;$ and 5-40 weight percent, of weight of the polymerizable composition, of at least one second monomer represented by any one of the formulas (II), (III) or (IV):

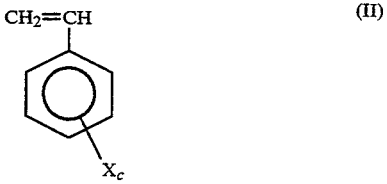

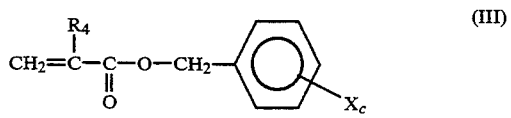

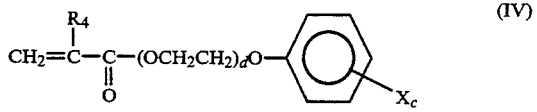

wherein $R_4$ represents H or $CH_3$, X represents $C_1$-$C_4$ alkyl or halogen other than fluorine, c represents an integer of from 0 to 5, and d represents an integer of from 0 to 5; in the presence of 0.005 to 1.0 weight percent, based on said polymerizable composition, of an organic chain transfer agent having a chain transfer coefficient at 50°-60° C. greater than 0.5 with acrylic monomer or styrenic monomer; and 0.05-2.0% by weight based on the weight of the polymerizable composition, of a radical polymerization initiator.

2. The process of claim 1 wherein said chain transfer agent is employed in an amount of 0.05 to 0.5 wt % based on said polymerizable composition.

3. The process of claim 2 wherein said polymerization step comprises at least 4 hours at 35° C., at least 12 hours in a linear temperature rise program from 35° C. to 90° C. and at least one hour at 90° C.

4. The process of claim 2 wherein said chain transfer agent is selected from α-bromomethylstyrene, ethyl-2-bromomethylpropenoate, tetrabromomethane and trichlorobromomethane.

5. A copolymer suitable for use in an optical element obtained by the radical polymerization of a composition which comprises at least 45% by weight, of the weight of the polymerizable composition, of at least one first monomer represented by the formula (I):

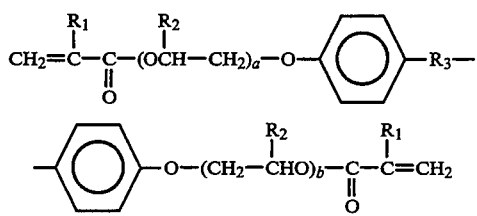

wherein a and b are integers of from 0 to 4,

R$_1$ and R$_2$ represent H or CH$_3$, and R$_3$ represents $$-O-, -S-, -CO-, -SO_2-, -CH_2-,$$

$$-CH=CH- \text{ or } CH_3-\underset{|}{\overset{|}{C}}-CH_3;$$

and 5-40 weight percent, of the weight of the polymerizable composition, of at least one second monomer represented by any one of the formulas (II), (III) or (IV):

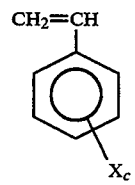

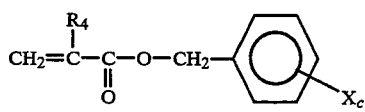

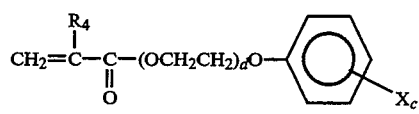

wherein R$_4$ represents H or CH$_3$, X represents C$_1$-C$_4$ alkyl or halogen other than fluorine, c represents an integer of from 0 to 5, and d represents an integer of from 0 to 5; in the presence of and 0,005 to 1.0 weight percent, based on the polymerizable composition of an organic chain transfer agent having a chain transfer coefficient at 50°-60° C. greater than 0.5 with acrylic monomer or styrenic monomer; and 0.05-2.0% by weight, based in the weight of the polymerizable composition, of a radical polymerization initiator.

6. The copolymer of claim 5 wherein said chain transfer agent is employed in an amount of 0.05 to 0.5 wt %, based on said polymerizable composition.

7. The copolymer of claim 6 wherein said polymerization step comprises at least four hours at 35° C., at least 12 hours in a linear temperature rise program from 35° C. to 90° C. and at least one hour at 90° C.

8. The copolymer of claim 6 wherein said chain transfer agent is selected from α-bromomethylstyrene, ethyl-2-bromomethylpropenoate, tetrabromomethane and trichlorobromomethane.

9. The copolymer of claim 6 wherein said polymerizable composition further comprises up to 50% by weight of the polymerizable composition of a third monomer selected from naphthylmethacrylates, vinylnaphthanlenes, 4-vinylbiphenyl, divinylbenzene, vinylphenylsulphide and alkyl(meth)acrylic acid esters.

10. An optical element which comprises a copolymer as claimed in claim 6.

* * * * *

UNITED STATES PATENT AND TRADEMARK OFFICE
CERTIFICATE OF CORRECTION

PATENT NO. : 5,349,035

DATED : September 20, 1994

INVENTOR(S) : Johannes Brand and Wilfridus M. Brouwer

It is certified that error appears in the above-identified patent and that said Letters Patent is hereby corrected as shown below:

In Claim 5, line 23 of column 8, "0,005" should read -- 0.005 --.

Signed and Sealed this

Thirteenth Day of December, 1994

Attest:

BRUCE LEHMAN

*Attesting Officer*       *Commissioner of Patents and Trademarks*